(12) United States Patent
Liang

(10) Patent No.: US 7,728,920 B2
(45) Date of Patent: Jun. 1, 2010

(54) LIQUID CRYSTAL DISPLAY WITH SLIDABLY ASSEMBLED FRAMES

(75) Inventor: Chao Liang, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 119 days.

(21) Appl. No.: 12/005,820

(22) Filed: Dec. 28, 2007

(65) Prior Publication Data

US 2008/0158473 A1 Jul. 3, 2008

(30) Foreign Application Priority Data

Dec. 29, 2006 (TW) .............................. 95223101 U

(51) Int. Cl.
*G02F 1/1333* (2006.01)
(52) U.S. Cl. .............................. 349/60; 349/58; 349/59
(58) Field of Classification Search ............. 349/58–60
See application file for complete search history.

(56) References Cited

U.S. PATENT DOCUMENTS

| 6,392,723 | B1* | 5/2002 | Sugiyama et al. ............. | 349/58 |
| 6,490,016 | B1* | 12/2002 | Koura ......................... | 349/58 |
| 6,961,103 | B2 | 11/2005 | Sung et al. | |
| 7,215,389 | B2* | 5/2007 | Shida .......................... | 349/58 |

* cited by examiner

*Primary Examiner*—Frank G Font
*Assistant Examiner*—Eric Wong
(74) *Attorney, Agent, or Firm*—Wei Te Chung

(57) ABSTRACT

An exemplary liquid crystal display includes a first frame and a second frame. The first frame includes two opposite first side walls, and each first side wall includes at least one slideway defined therein. The second frame includes two opposite second side walls, and the second side walls respectively correspond to the first side walls. Each second wall includes at least one strip provided thereat. The first strips of the second frame are slidable along the corresponding first slideways such that the first frame and the second frame are detachably engaged together.

20 Claims, 9 Drawing Sheets

LIQUID CRYSTAL DISPLAY WITH SLIDABLY ASSEMBLED FRAMES

FIELD OF THE INVENTION

The present invention relates to a liquid crystal display (LCD) that includes at least two frames slidably assembled together.

GENERAL BACKGROUND

Liquid crystal displays are commonly used as display devices for compact electronic apparatuses, not only because they provide good quality images but also because they are very thin. A typical liquid crystal display includes a two-part housing; that is, a plastic frame and a metal frame attached together.

Referring to FIG. 14, a typical liquid crystal display 8 includes a top bezel 80, a liquid crystal panel 81, a plastic frame 82, a brightness enhancement film (BEF) 83, a diffusing film 84, a light guide plate (LGP) 85, a reflective film 86, and a bottom tray 87, arranged in that order from top to bottom. The liquid crystal display 8 further includes a linear light source 88 disposed adjacent to the light guide plate 85.

The top bezel 80 includes a plurality of first notches 802 respectively defined in each of four vertical side plates (not labeled) thereof. The bottom tray 87 includes a plurality of second notches 872 respectively defined in a plurality of vertical side tabs (not labeled) thereof. The plastic frame 82 includes a plurality of first ears 822 and second ears 824 outwardly extending from each of four vertical side walls (not labeled) thereof. The first ears 822 of the plastic frame 82 respectively correspond to the first notches 802 of the top bezel 80, and the second ears 824 of the plastic frame 82 respectively correspond to the second notches 872 of the bottom tray 87.

When the liquid crystal display 8 is assembled, the liquid crystal panel 81, the BEF 83, the diffusing film 84, the light guide plate 85, the reflective film 86, and the light source 88 are accommodated in the plastic frame 82. The top bezel 80 and the bottom tray 87 are respectively fixed to the plastic frame 82, with the first ears 822 of the plastic frame 82 respectively fixed in the first notches 802 of the top bezel 80, and the second ears 824 of the plastic frame 82 respectively fixed in the second notches 872 of the bottom tray 87.

In the operation of fixing the top bezel 80 and the bottom tray 87 to the plastic frame 82, the vertical side plates of the top bezel 80 and the vertical side tabs of the bottom tray 87 need to be outwardly pressed to fix the first and second ears 822, 824 in the respective first and second notches 802, 872. In addition, in an operation of detaching the top bezel 80 and the bottom tray 87 from the plastic frame 82, the vertical side plates of the top bezel 80 and the vertical side tabs of the bottom tray 87 need to be outwardly pressed to release the first and second ears 822, 824 from the respective first and second notches 802, 872. The above-described operations are somewhat inconvenient and time-consuming, and this can contribute to the cost of assembling the liquid crystal display 8. Further, the vertical side plates of the top bezel 80 and the vertical side tabs of the bottom tray 87 may be deformed in the above-described operations. When this occurs, the mechanical stability of the liquid crystal display 8 at the top bezel 80 and the bottom tray 87 is liable to be impaired. This is turn may cause the liquid crystal display 8 to malfunction, and may reduce the durability of the liquid crystal display 8.

What is needed, therefore, is a liquid crystal display that can circumvent, overcome or at least mitigate the above-described difficulties.

SUMMARY

In a preferred embodiment, a liquid crystal display includes a first frame and a second frame. The first frame includes two opposite first side walls, and each first side wall includes at least one slideway defined therein. The second frame includes two opposite second side walls, and the second side walls respectively correspond to the first side walls. Each second wall includes at least one strip provided thereat. The first strips of the second frame are slidable along the corresponding first slideways such that the first frame and the second frame are detachably engaged together.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe various embodiments of the present invention in detail.

Figure 1:
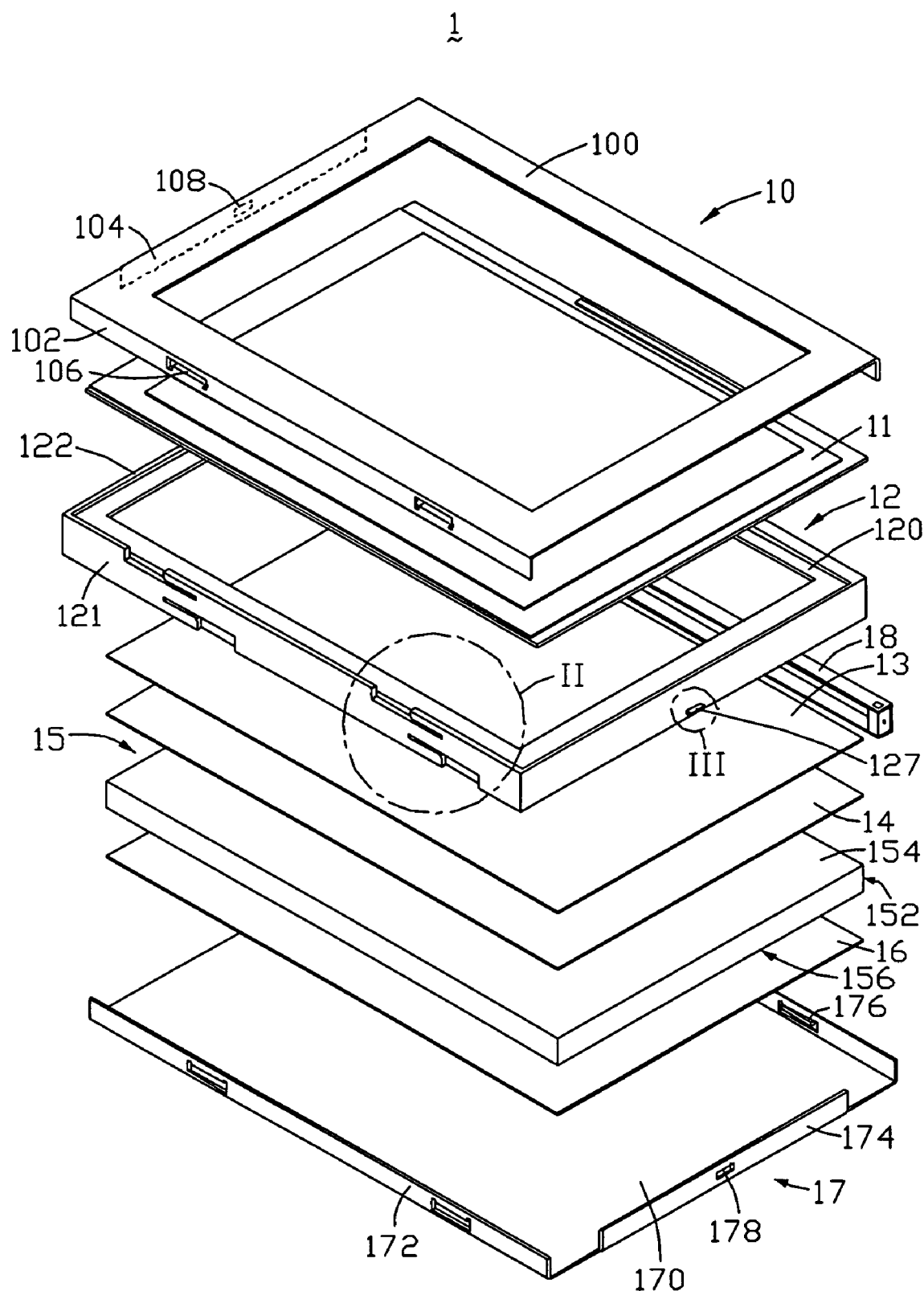
FIG. 1 is an exploded, isometric view of a liquid crystal display according to a first embodiment of the present invention.

Referring to FIG. 1, a liquid crystal display 1 according to a first embodiment of the present invention is shown. The liquid crystal display 1 includes a top bezel 10, a liquid crystal panel 11, a plastic frame 12, a BEF 13, a diffusing film 14, a light guide plate 15, a reflective film 16, and a bottom tray 17, arranged in that order from top to bottom. The liquid crystal display 1 further includes a linear light source 18 disposed adjacent to the light guide plate 15.

The top bezel 10 includes a top plate 100, two symmetrically opposite first side plates 102, and a second side plate 104 (shown in broken lines). The top plate 100 is substantially a rectangular frame, which defines a central window (not labeled) corresponding to the liquid crystal panel 11. The first side plates 102 downwardly extend from two opposite long sides of the top plate 100, respectively. Each first side plate 102 includes two first notches (not labeled) defined therein, and two first strips 106 inwardly extending from bottom ends (not labeled) of the first notches. Each first strip 106 is adjacent to a corresponding first notch, and is perpendicular to the first side plate 102. The second side plate 104 downwardly extends from a short side of the top plate 100, and includes a second notch 108 defined in a central portion thereof. The top bezel 10 can for example be made from steel, iron, aluminum, magnesium, or any suitable alloy that includes at least one of these metals.

The light guide plate 15 includes a light incident surface 152 at a lateral thin side thereof, a top light emitting surface 154 perpendicularly connected with the light incident surface 152, and a bottom surface 156. The light guide plate 15 can for example be made from polycarbonate (PC) or polymethyl methacrylate (PMMA), and can be manufactured by an injection molding method. The diffusing film 14 is located between the light emitting surface 154 of the light guide plate 15 and the BEF 13. The reflective film 16 is located adjacent to the bottom surface 156 of the light guide plate 15. The light source 18 is located adjacent to the light incident surface 152 of the light guide plate 15, and includes a cold cathode fluorescent lamp (CCFL) for providing light beams to the light guide plate 15. In an alternative embodiment, the light source 18 can include one or more hot cathode fluorescent lamps (HCFLs).

The bottom tray 17 includes a bottom plate 170, two symmetrically opposite third side plates 172, and a fourth side plate 174. The bottom plate 170 is planar and substantially rectangular. The third side plates 172 upwardly extend from two opposite long sides of the bottom plate 170, respectively. Each third side plate 172 includes two third notches (not labeled) defined therein, and two second strips 176 inwardly extending from top ends (not labeled) of the third notches. Each second strip 176 is adjacent to a corresponding third notch, and is perpendicular to the third side plate 172. The fourth side plate 174 upwardly extends from a short side of the bottom plate 170, and includes a fourth notch 178 defined in a central portion thereof. The bottom tray 17 can for example be made from steel, iron, aluminum, magnesium, or any suitable alloy that includes at least one of these metals.

The plastic frame 12 is generally rectangular. The plastic frame 12 includes a supporting board 120, two symmetrically opposite first side walls 121, and two symmetrically opposite second side walls 122. The supporting board 120 is in general a rectangular frame forming part of the frame 12. Portions of the supporting board 120 perpendicularly extend inwardly from inner surfaces (not labeled) of the first and second side walls 121, 122. Thus the supporting board 120 defines a rectangular space (not labeled) for accommodating the liquid crystal panel 11, the BEF 13, the diffusing film 14, the light guide plate 15, and the light source 18.

Figure 2:
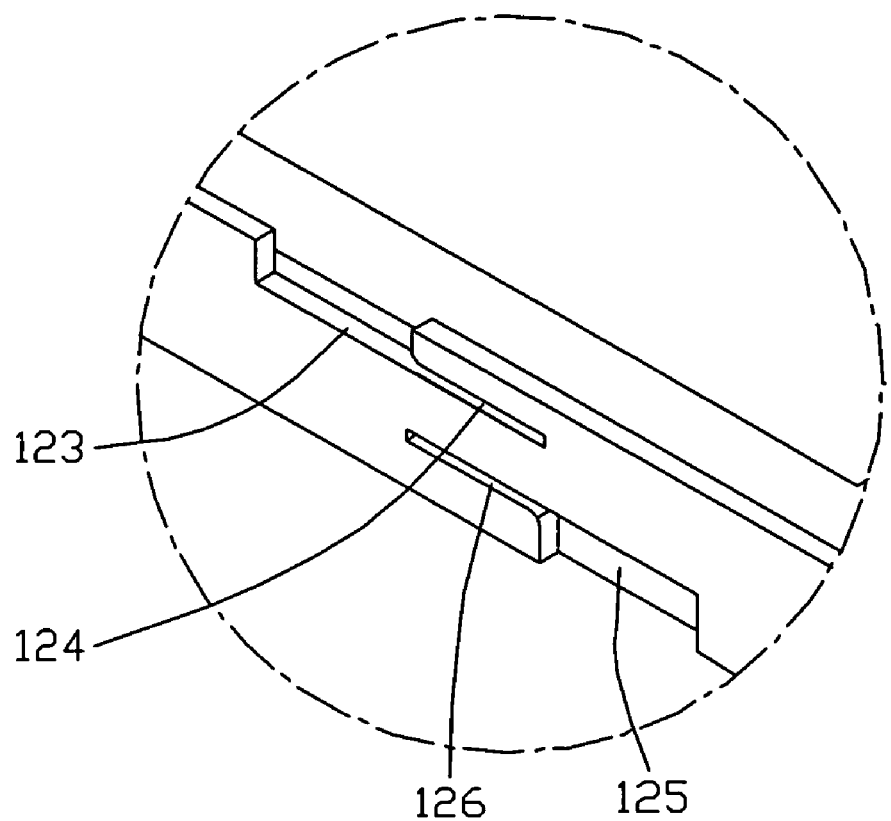
FIG. 2 is an enlarged view of a circled portion II of FIG. 1.

Each first side wall 121 is substantially bar-shaped. Referring also to FIG. 2, the first side wall 121 includes two upper notches 123, two upper slideways 124, two lower notches 125, and two lower slideways 126 defined therein. The upper notches 123 and the upper slideways 124 are defined at top portions of the first side wall 121. Each upper notch 123 is directly in communication with one respective upper slideway 124. A portion (not labeled) of the first side wall 121 bounding bottoms of the upper notch 123 and the upper slideway 124 is substantially a single, elongate coplanar surface. Each pair of an upper notch 123 and the corresponding upper slideway 124 corresponds to one respective first strip 106 of the top bezel 10. A horizontal length of the upper notch 123 is slightly greater than a horizontal length of the first strip 106, and a vertical height of the upper slideway 124 is slightly greater than a vertical thickness of the first strip 106. That is, the first strip 106 can be received in the upper notch 123, and can fittingly slide along the corresponding upper slideway 124.

Figure 3:
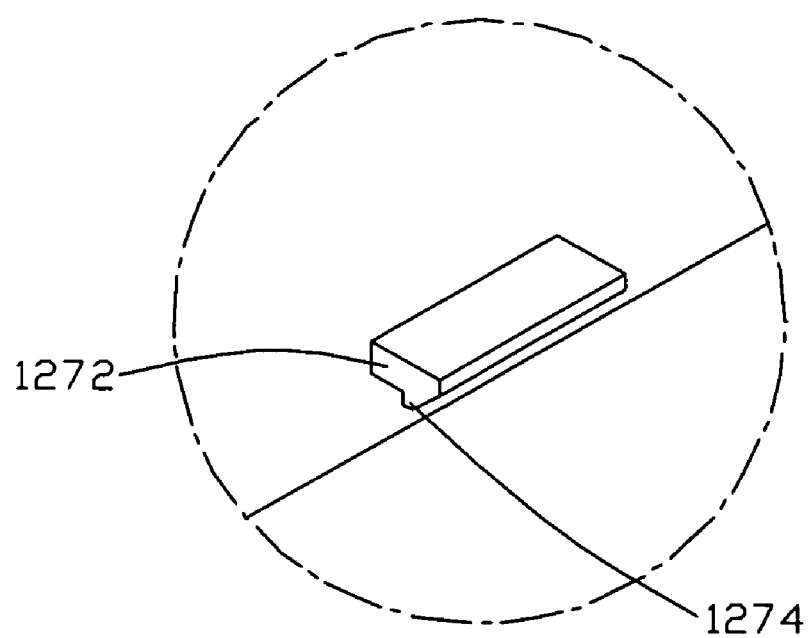
FIG. 3 is an enlarged view of a circled portion III of FIG. 1.

The second side walls 122 are substantially bar-shaped, and respectively extend along two opposite short sides of the plastic frame 12. Each second side wall 122 includes an elastic ear 127 outwardly extending from an outer surface (not labeled) thereof. One elastic ear 125 corresponds to the second notch 108 of the top bezel 10, and the other elastic ear 127 corresponds to the fourth notch of the bottom tray 17. Referring also to FIG. 3, each elastic ear 127 includes a main portion 1272, and a protruding portion 1274 extending downwardly from the main portion 1272.

The lower notches 125 and the lower slideways 126 are respectively defined at bottom portions of the first side walls 121. Each lower notch 125 is in direct communication with one corresponding lower slideway 126. A portion (not labeled) of the first side wall 121 bounding tops of the lower notch 125 and the lower slideway 126 is substantially a single, elongate coplanar surface. Each pair of the lower notch 125 and the corresponding lower slideway 126 corresponds to one respective second strip 176 of the bottom tray 17. A horizontal length of the lower notch 125 is slightly greater than a horizontal length of the second strip 176, and a vertical height of the lower slideway 126 is slightly greater than a vertical thickness of the second strip 176. That is, the second strip 176 can be received in the lower notch 125, and can fittingly slide along the corresponding lower slideway 126.

Figure 4:
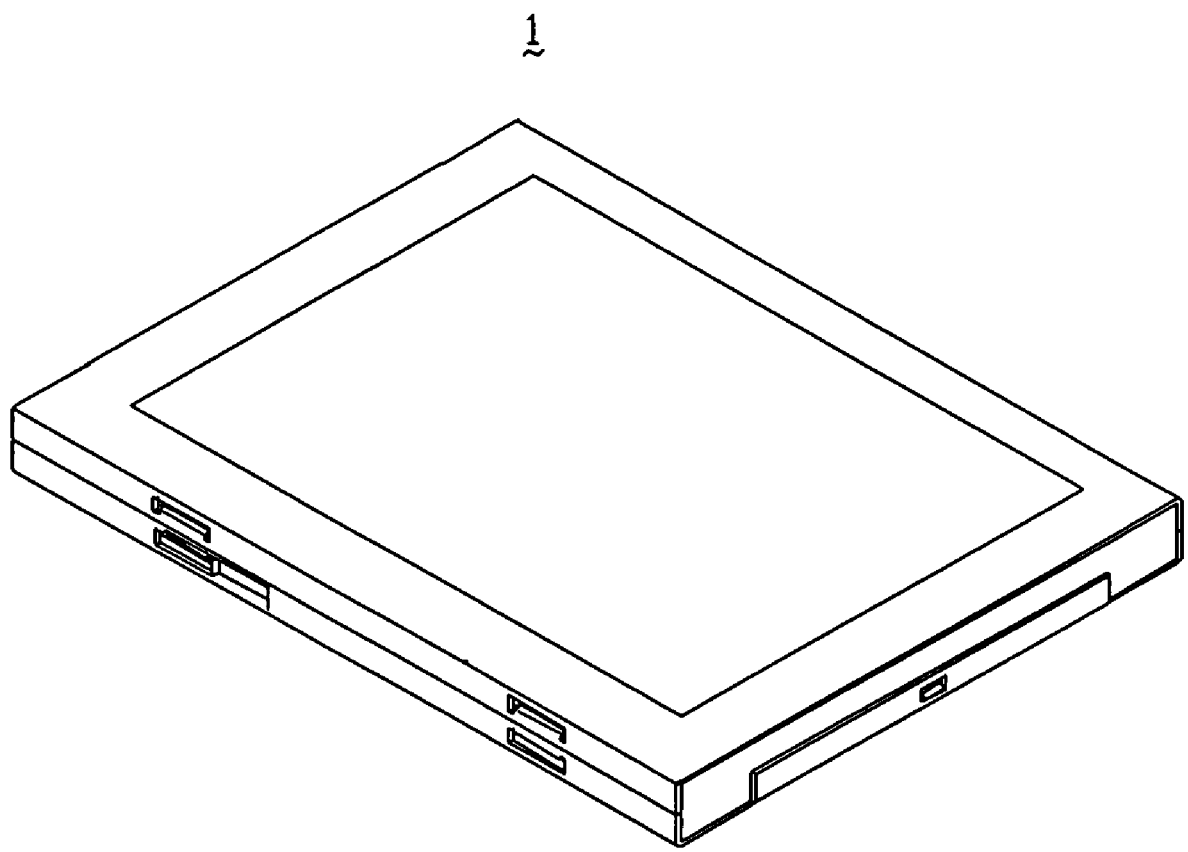
FIG. 4 is an assembled view of the liquid crystal display of FIG. 1.

The liquid crystal display 1 can be assembled as follows. First, the liquid crystal panel 11, the BEF 13, the diffusing film 14, the light guide plate 15, and the light source 18 are received in the space of the plastic frame 12, in that order from top to bottom. Second, the top bezel 10 is aligned with the plastic frame 12, whereby the first strips 106 of the top bezel 10 are respectively received in the upper notches 123 of the plastic frame 12. Third, the top bezel 10 is pushed in a direction from the second side plate 104 toward an opposite side of the top bezel 10. The first strips 106 respectively slide into the upper slideways 124, and the protruding portion 1274 of the elastic ear 127 corresponding to the second notch 108 fittingly abuts a vertical outer surface (not labeled) of the second side plate 104. Thereby, the top bezel 10 is securely attached to the plastic frame 12, and is prevented from sliding off from the plastic frame 12 by the protruding portion 1274 of the elastic ear 127. Fourth, the reflective film 16 and the bottom tray 17 are aligned with the above-described subassembly. The reflective film 16 is positioned on the bottom plate 170 of the bottom tray 17, and corresponds to the bottom surface 156 of the light guide plate 15. The second strips 176 of the bottom tray 17 are respectively received in the lower notches 125 of the plastic frame 12. Fifth, the bottom tray 17 is pushed in a direction from the fourth side plate 174 toward an opposite side of the bottom tray 17. The second strips 176 slide into the respective lower slideways 126, and the protruding portion 1274 of the other elastic ear 127 fittingly abuts a vertical outer surface (not labeled) of the fourth side plate 174. Thereby, the bottom tray 17 is securely attached to the plastic frame 12, and is prevented from sliding off from the plastic frame 12 by the protruding portion 1274 of the other elastic ear 127, as shown in FIG. 4.

Detachment of the top bezel 10 and the bottom tray 17 from the plastic frame 12 is essentially the reverse of the above-described assembly procedure. In an alternative embodiment, the bottom tray 17 can be attached to the plastic frame 12 before the top bezel 10 is attached to the plastic frame 12.

In the liquid crystal display 1, the top bezel 10 and the bottom tray 17 can be reliably attached to the plastic frame 12 or detached from the plastic frame 12 by sliding operation. Such operation is convenient and timesaving, and can help reduce the cost of assembling the liquid crystal display 1. Further, the top bezel 10 and the bottom tray 17 are prevented from sliding off from the plastic frame 12 by the elastic ears 127. Unlike in conventional art, neither the top bezel 10 nor the bottom tray 17 needs to be outwardly pressed in the processes of attachment or detachment. Therefore deformation of the top bezel 10 and the bottom tray 17 can be avoided. The top bezel 10 and the bottom tray 17 are locked in position on the plastic frame 12, and the liquid crystal display 1 thereby has good mechanical stability. Furthermore, the sliding operation for the upper slideways 124 and the sliding operation for the lower slideways 126 are performed in opposite directions, which ensures the correct alignment of the top bezel 10 and the bottom tray 17.

Figure 5:
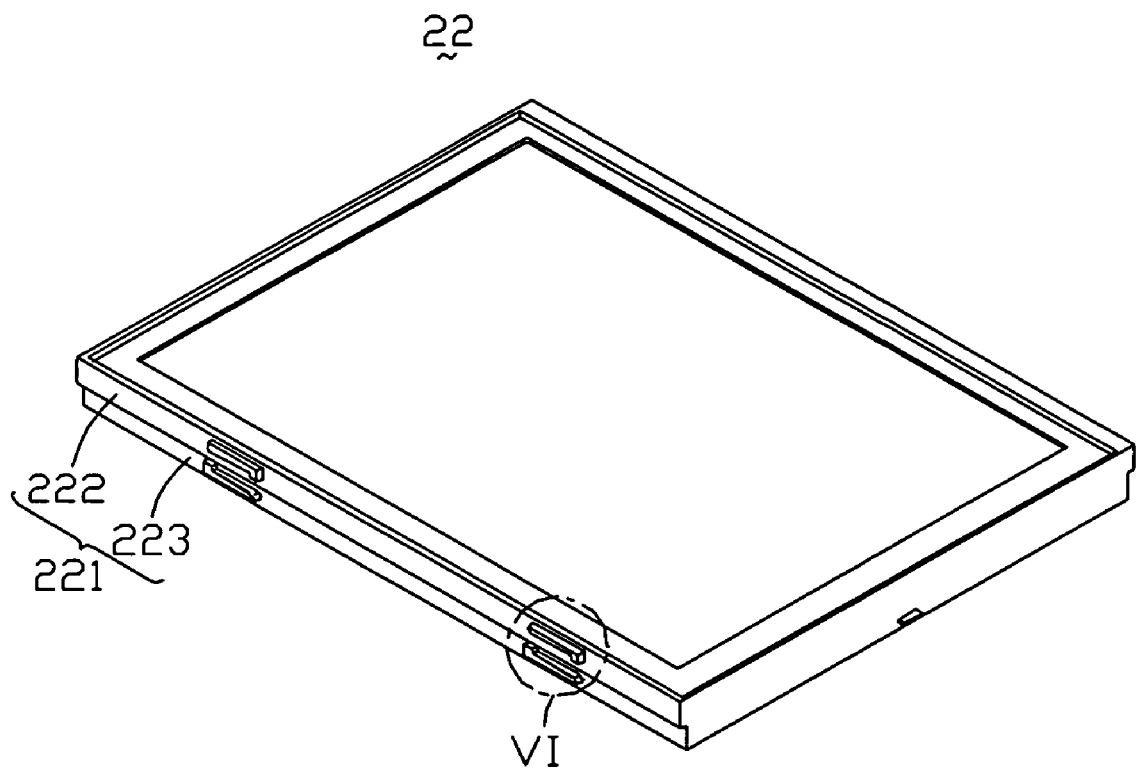
FIG. 5 is an isometric view of a plastic frame of a liquid crystal display according to a second embodiment of the present invention.

Referring to FIG. 5, a liquid crystal display 2 according to a second embodiment of the present invention is similar to the liquid crystal display 1 of the first embodiment. However, the liquid crystal display 2 includes a top bezel (not shown), a plastic frame 22, and a bottom tray (not shown). The plastic frame 22 includes two first side walls 221 respectively extending along two opposite long sides thereof. Each first side wall 221 includes an upper portion 222, and a lower portion 223 in connection with the upper portion 222 as a whole piece. The upper portion 222 vertically extends outwardly over the lower portion 223, thus defining an L-shaped profile of the first side wall 221. The upper portion 222 includes two L-shaped first protrusions 224 outwardly extending from an outer surface (not labeled) thereof. Each first protrusion 224 includes a first main portion 2242 and a first sub-portion 2244. The first main portion 2242 horizontally extends parallel to a top surface (not labeled) of the first side wall 221, and the first sub-portion 2244 vertically extends from the first main portion 2242.

Figure 6:
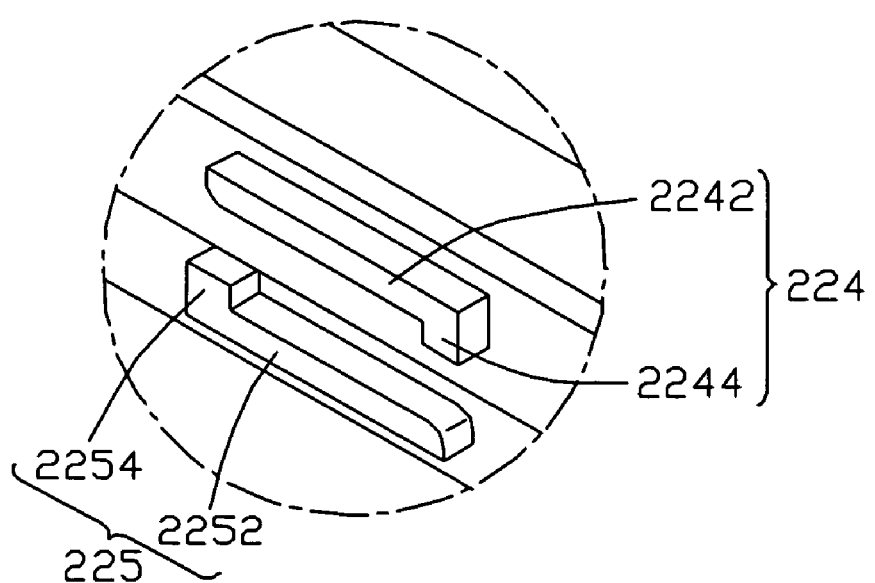
FIG. 6 is an enlarged view of a circled portion VI of FIG. 5.

The lower portion 223 includes two L-shaped second protrusions 225 outwardly extending from an outer surface (not labeled) thereof. Referring also to FIG. 6, each second protrusion 225 includes a second main portion 2252 and a second sub-portion 2254. The second main portion 2252 horizontally extends parallel to the top surface of the first side wall 221, and the second sub-portion 2254 vertically extends from the second main portion 2252. In the illustrated embodiment, the first sub-portions 2244 and the second sub-portions 2254 are oppositely aligned with each other.

In assembly of the liquid crystal display 2, a first strip (not shown) of the top bezel can slide along a bottom surface (not labeled) of the first main portion 2242 until reaching a vertical surface (not labeled) perpendicular to the bottom surface of the sub-portion 2244. Therefore, the bottom surface of the first main portion 2242 can fittingly stop the first strip from being lifted-off from the plastic frame 22. Similarly to the top bezel, the bottom tray can also be securely attached to the plastic frame 22. In other respects, the liquid crystal display 2 has features and advantages similar to those described above in relation to the liquid crystal display 1.

Figure 7:
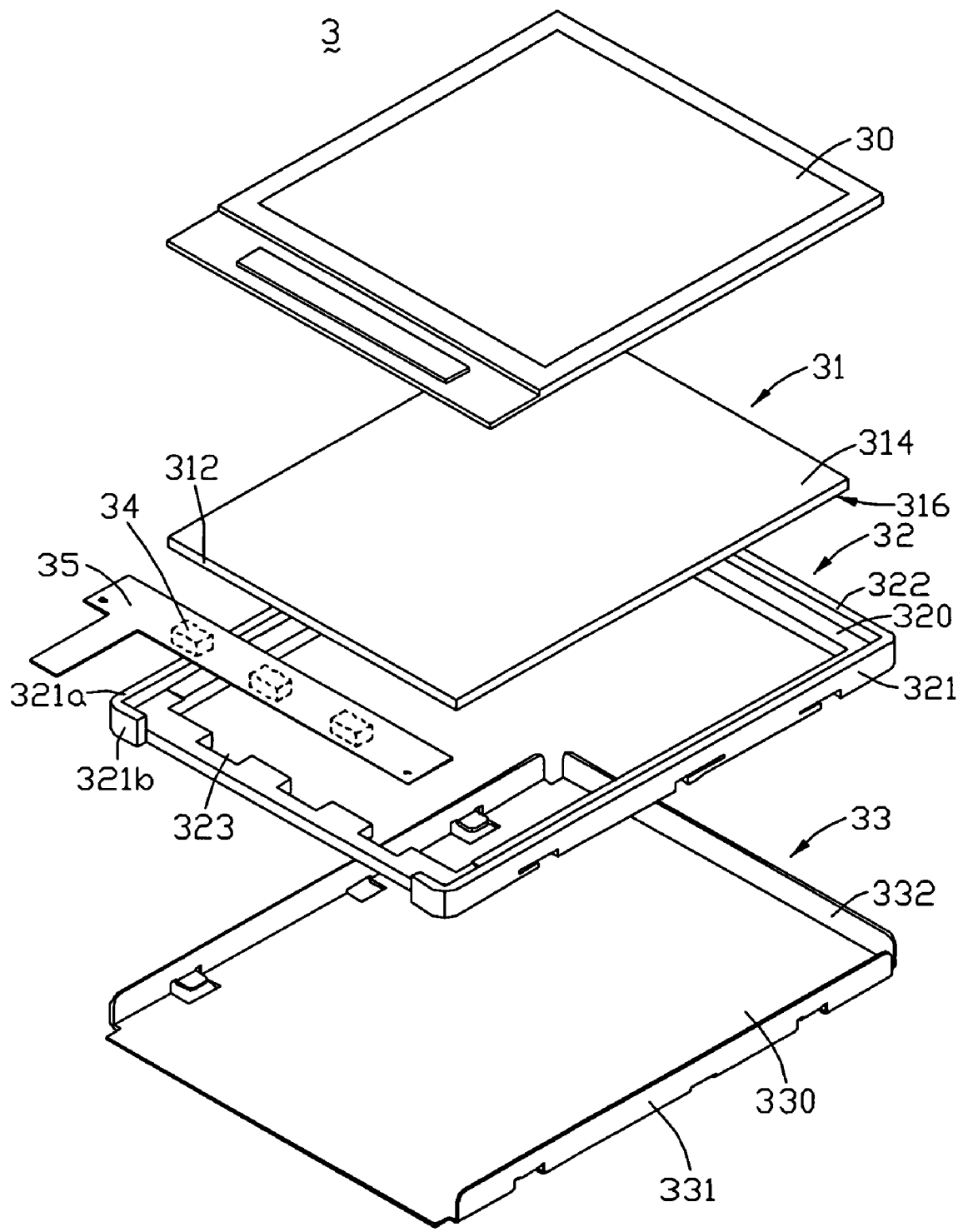
FIG. 7 is an exploded, isometric view of a liquid crystal display according to a third embodiment of the present invention, the liquid crystal display including a plastic frame and a bottom tray.

Referring to FIG. 7, a liquid crystal display 3 according to a third embodiment of the present invention is shown. The liquid crystal display 3 includes a liquid crystal panel 30, a light guide plate 31, a plastic frame 32, and a bottom tray 33, arranged in that order from top to bottom. The liquid crystal display 3 further includes a plurality of point illuminators 34 for being located adjacent to a light incident surface 312 of the light guide plate 31, and a printed circuit board 35 electrically connected with the point illuminators 34. The light guide plate 31, the plastic frame 32, and the point illuminators 34 cooperatively form a backlight module (not labeled).

The printed circuit board 35 includes a connection strip (not labeled) extending from a main body (not labeled) thereof. The point illuminators 34 are attached on the main body of the printed circuit board 35, and cooperatively serve as a light source. In the illustrated embodiment, the point illuminators 34 are three light emitting diodes, and the printed circuit board 35 is a flexible printed circuit board (FPCB).

The light guide plate 31 includes the light incident surface 312, a top light emitting surface 314 perpendicularly connected with the light incident surface 312, and a bottom surface 316. The liquid crystal panel 30 is disposed adjacent to the light emitting surface 314 of the light guide plate 31.

Figure 8:
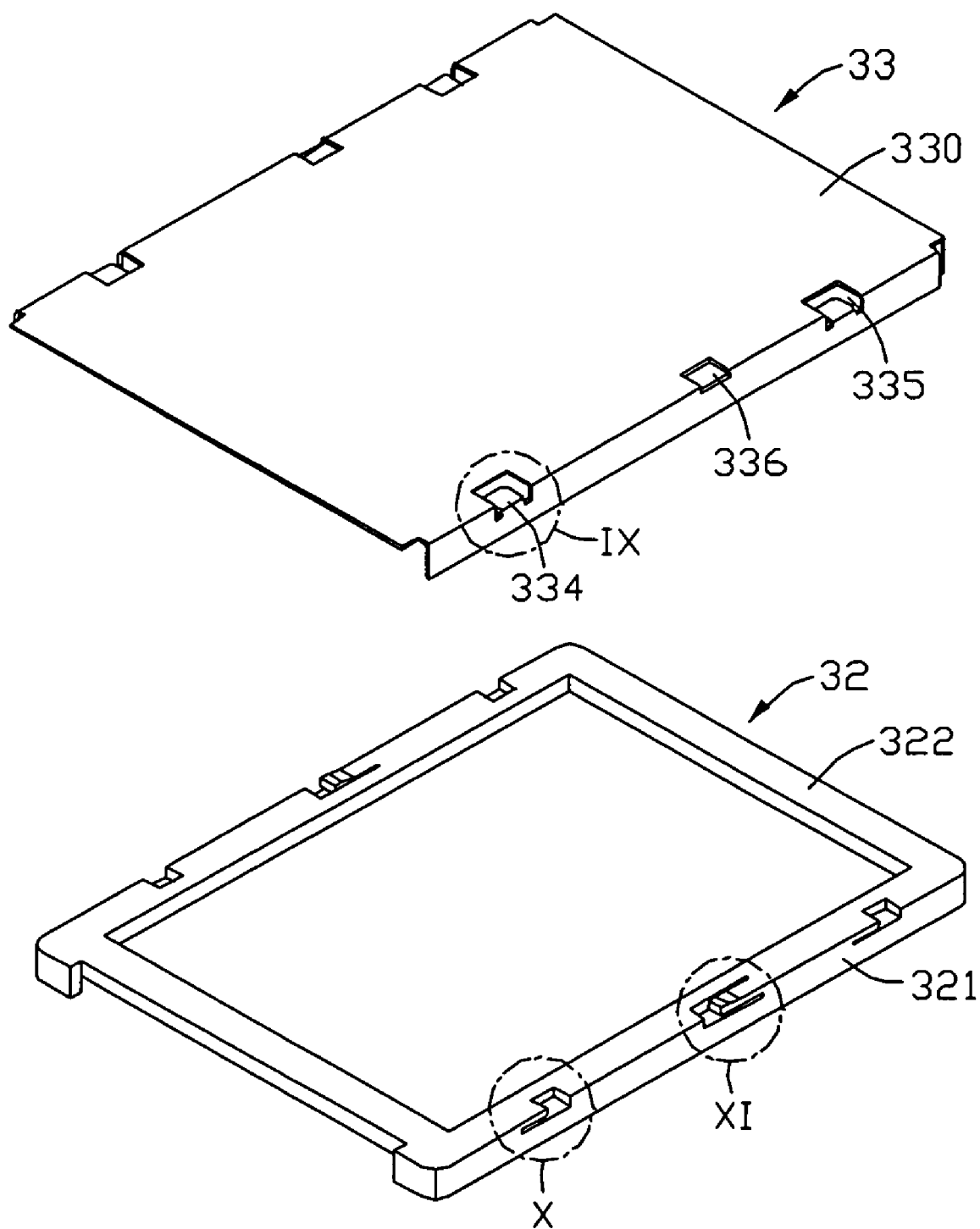
FIG. 8 is an inverted, isometric view of the plastic frame and the bottom tray of FIG. 7.
Figure 9:
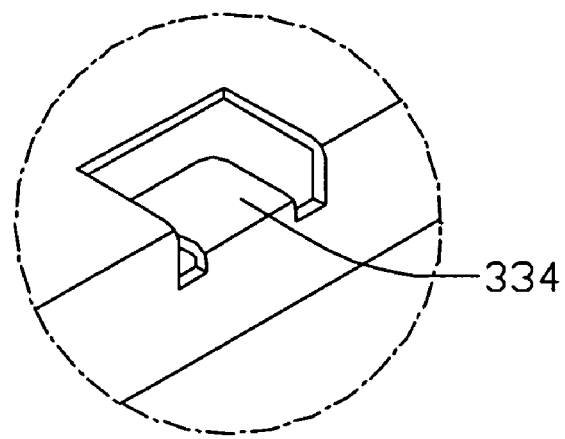
FIG. 9 is an enlarged view of a circled portion IX of FIG. 8.

Referring also to FIG. 8, the bottom tray 33 includes a bottom plate 330, two symmetrically opposite first side plates 331, and a second side plate 332. The bottom plate 330 is planar and substantially rectangular. The first side plates 331 extend in directions toward the plastic frame 32 from two opposite long sides of the bottom plate 330, respectively. The second side plate 332 extends along a corresponding short side of the bottom plate 330. Thus the bottom plate 330, the first side plate 331, and the second side plate 332 cooperatively define a housing (not labeled). Referring also to FIG. 9, each first side plate 331 includes two strips 334 inwardly extending therefrom, and defines two first notches 335 and a second notch 336 therein. Each first notch 335 is adjacent to one corresponding strip 334. The second notch 336 is defined between the first notches 335. In the illustrated embodiment, the strips 334, the first notches 335, and the second notches 336 are substantially rectangular. The bottom tray 33 can for example be made from steel, iron, aluminum, magnesium, or any suitable alloy that includes at least one of these metals.

The plastic frame 32 is generally rectangular. The plastic frame 32 includes a supporting board 320, two symmetrically opposite first side walls 321, and a second side wall 322. The supporting board 320 is in general a rectangular frame forming part of the plastic frame 32. Portions of the supporting board 320 perpendicularly extend inwardly from inner surfaces (not labeled) of the first side walls 321 and the second side wall 322. Thus the supporting board 320 defines a rectangular space (not labeled) for accommodating the light guide plate 31 and the liquid crystal panel 30. The supporting board 320 includes a plurality of third notches 323 defined along an inner surface (not labeled) one short side thereof. The third notches 323 are opposite to the second side wall 322 of the plastic frame 32, and are communicated with the space. In the illustrated embodiment, there are three third notches 323. The point illuminators 34 can be respectively disposed in the third notches 323.

Each first side wall 321 is generally L-shaped, and includes a long arm 321a and a short arm 321b. The long arm 321a extends along a corresponding long side of the plastic frame 32. The short arm 321b is perpendicularly connected with the long arm 321a, and extends along a short side of the plastic frame 32. The short arms 321b of the two first side walls 321 are located at the same short side of the plastic frame 32, and a long opening (not labeled) is defined therebetween. The second side wall 322 interconnects the long arms 321a of the two opposite first side walls 321, and is located at the other short side opposite to the short arms 321b of the plastic frame 32. The connection strip of the printed circuit board 35 can be received in the opening.

Figure 10:
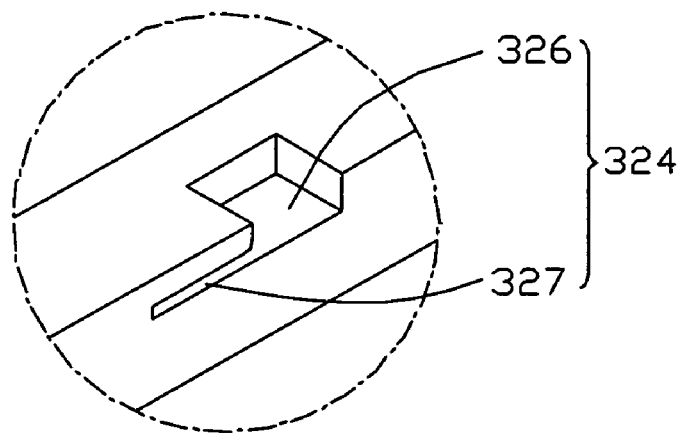
FIG. 10 is an enlarged view of a circled portion X of FIG. 8.

Each long arm 321a of the first side wall 321 includes two pairs of fixing assemblies 324, and a spring assembly 325 located between the fixing assemblies 324. Referring also to FIG. 10, each fixing assembly 324 includes a fourth notch 326 defined in a bottom portion thereof, and a first slideway 327 in communication with the fourth notch 326. Each pair of the fourth notch 326 and the first slideway 327 corresponds to one respective strip 334 of the bottom tray 33, and the respective strip 334 can be received in the fourth notch 326, and slide into the first slideway 327 via the fourth notch 326.

Figure 11:
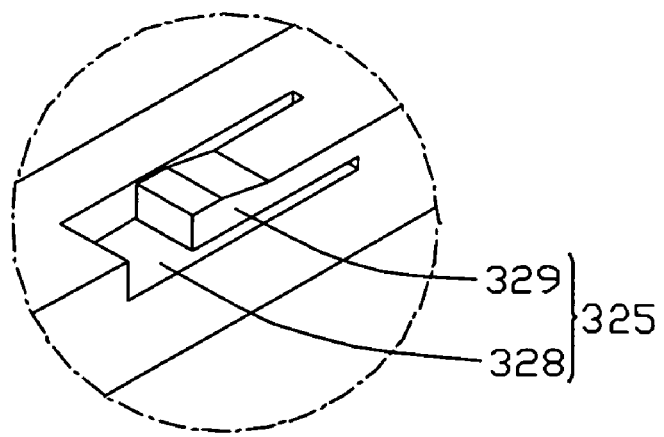
FIG. 11 is an enlarged view of a circled portion XI of FIG. 8.

Each spring assembly 325 corresponds to one respective second notch 336 of the bottom tray 33. Referring also to FIG. 11, the spring assembly 325 includes a fifth notch 328, and a spring pin 329 extending into the fifth notch 328, thus defining a second slideway (not labeled). An outmost extremity (not labeled) of the spring pin 329 slightly protrudes from a bottom surface (not labeled) of the long arm 321a. That is, the outmost extremity of the spring pin 329 can be elastically pressed in the fifth notch 328, and can recover from the fifth notch 328. The plastic frame 32 is preferably made from white polycarbonate or plastic. Alternatively, the plastic frame 32 can be made from any other suitable material.

Figure 12:
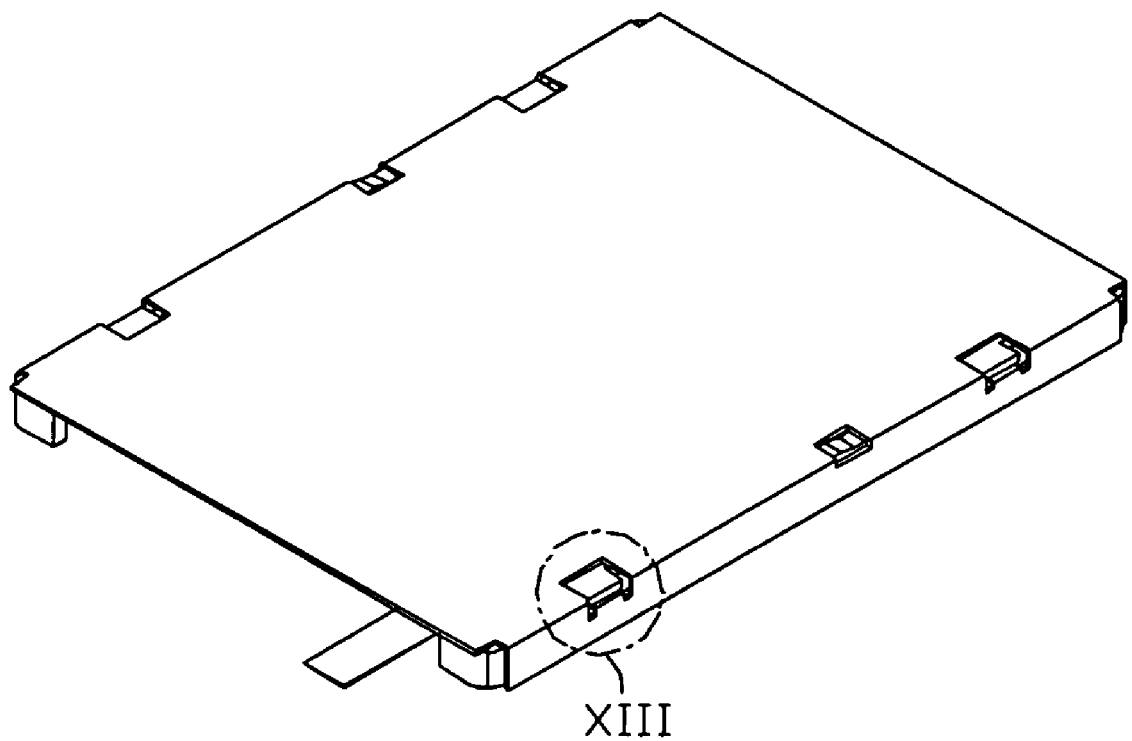
FIG. 12 is an assembled view of the plastic frame and the bottom tray of FIG. 8.
Figure 13:
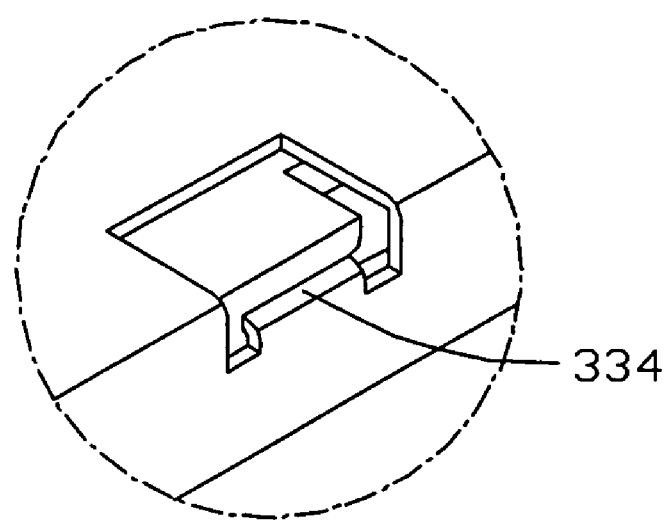
FIG. 13 is an enlarged view of a circled portion XIII of FIG. 12.
Figure 14:
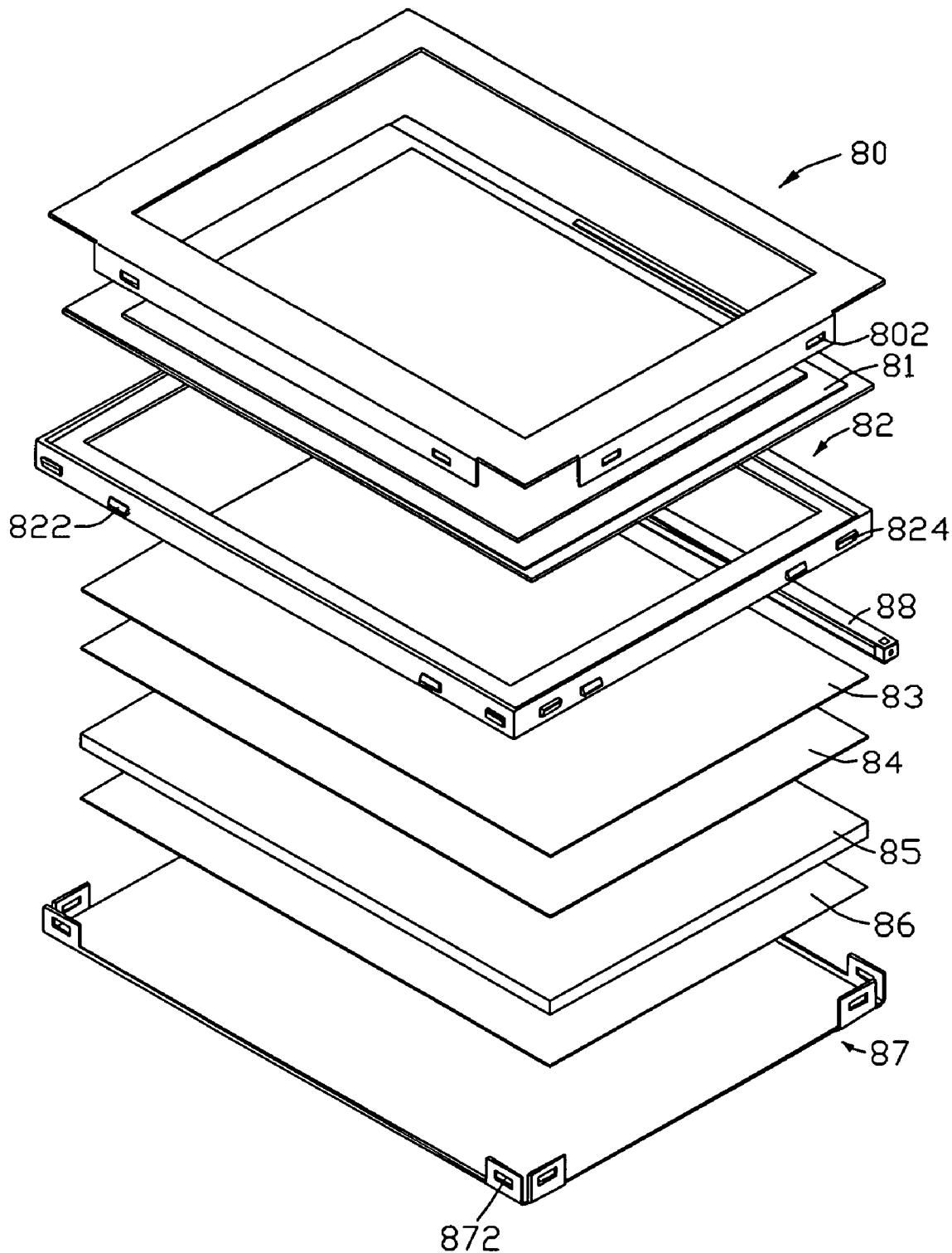
FIG. 14 is an exploded, isometric view of a conventional liquid crystal display.

The bottom tray 33 can be reliably attached to the plastic frame 32 as follows. First, the bottom tray 33 is aligned with the plastic frame 32. The first side plates 331 are respectively aligned with corresponding long arms 321a, and the strips 334 are respectively received in the fourth notches 326. The second side plate 332 is aligned with the second side wall 322. Second, the bottom tray 33 is pushed in a direction from the second side plate 332 toward an opposite side of the bottom tray 33. Therefore, the strips 334 of the bottom tray 33 respectively slide into the first slideways 327 of the plastic frame 32, as is shown in FIG. 12 and FIG. 13. The outmost extremities of the spring pins 328 are respectively exposed through the respective second notches 336, and outwardly protrude from the respective second notches 336. Thus, the bottom tray 33 is reliably assembled to the plastic frame 32, and is prevented from sliding off from the plastic frame 32 by the outmost extremities of the spring pins 328. Detachment of the bottom tray 33 from the plastic frame 32 is essentially the reverse of the above-described assembly procedure. In other respects, the liquid crystal display 3 has features and advantages similar to those described above in relation to the liquid crystal display 1.

Further or alternative embodiments may include the following. In one example, the bottom tray 33 includes a plurality of slideways defined therein. In such case, the plastic frame 32 includes a plurality of strips respectively corresponding to the slideways of the bottom tray 33. In another example, the number of the spring pins 328 and corresponding second notches 336 can be varied. For example, one, three, four, five or more spring pins 328 and corresponding second notches 336 can be employed as required.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
    a first frame comprising two opposite first side walls, each first side wall comprising at least one first slideway defined therein; and
    a second frame comprising two opposite second side walls, the second side walls respectively corresponding to the first side walls, each second side wall comprising at least one first strip provided thereat;
    wherein when the first frame and the second frame are placed one against the other with each of the at least one first strip adjacent an entrance to the corresponding first slideway of the at least one first slideway, the first and the second frames are slidable relative to each other such that the whole of the at least one first strip slides uniformly in a straight line along a length of the corresponding at least one first slideway to a blind end of the corresponding at least one first slideway and the first frame and the second frame are detachably engaged together.

2. The liquid crystal display as claimed in claim 1, wherein each first side wall further comprises at least one first notch defined therein, each of the at least one first notch being directly in communication with the corresponding first slideway of the at least one first slideway thereby providing access for the at least one first strip to enter the entrance of the corresponding first slideway.

3. The liquid crystal display as claimed in claim 2, wherein the at least one first strip is received in the at least one first notch, and slides into the at least one first slideway via the at least one first notch.

4. The liquid crystal display as claimed in claim 1, further comprising a third frame, wherein the third frame comprises two opposite third side walls respectively corresponding to the first side walls of the first frame.

5. The liquid crystal display as claimed in claim 4, wherein each first side wall further comprises at least one second notch and at least one second slideway defined therein, each of the at least one second notch being directly in communication with a corresponding second slideway of the at least one second slideway.

6. The liquid crystal display as claimed in claim 5, wherein each third side wall comprises at least one second strip provided thereat, the at least one second ship corresponding to the at least one second slideway.

7. The liquid crystal display as claimed in claim 6, wherein the at least one first notch is nearer a first end of the first frame than the corresponding at least one first slideway, and the at least one second notch is nearer an opposite second end of the first frame than the corresponding at least one second slideway.

8. The liquid crystal display as claimed in claim 6, wherein the first frame further comprises two opposite fourth side walls between the first side walls.

9. The liquid crystal display as claimed in claim 8, wherein each fourth side wall comprises a spring ear outwardly protruding therefrom.

10. The liquid crystal display as claimed in claim 9, wherein the second side wall further comprises a fifth side wall corresponding to one fourth side wall, and the fifth side wall comprises a third notch defined therein, the third notch corresponding to the spring ear of said one fourth side wall.

11. The liquid crystal display as claimed in claim 10, wherein the third side wall further comprises a sixth side wall corresponding to the other fourth side wall, and the sixth side wall comprises a fourth notch defined therein, the fourth notch corresponding to the other spring ear.

12. The liquid crystal display as claimed in claim 11, wherein each spring ear comprises a portion elastically abutting an outer surface of the fifth side wall or that of the sixth side wall.

13. The liquid crystal display as claimed in claim 1, wherein the at least one first slideway is defined by an L-shaped protrusion extending from an outer surface of the corresponding first side wall.

14. The liquid crystal display as claimed in claim 2, wherein the at least one first notch is two first notches, and each first side wall further comprises a spring catch located between the two first notches.

15. The liquid crystal display as claimed in claim 14, wherein the at least one first strip is two first strips, and the second frame further comprises a third notch defined between the two first strips, the third notch corresponding to the spring catch.

16. The liquid crystal display as claimed in claim 15, wherein the spring catch is configured for allowing the second frame to be detached from the first frame.

17. A liquid crystal display comprising:
- a first frame comprising at least one first side wall, the at least one first side wall comprising at least one notch and at least one slideway defined therein, the at least one slideway corresponding to the at least one notch; and
- a second frame comprising at least one second side wall, the at least one second side wall corresponding to the at least one first side wall and comprising at least one strip corresponding to the at least one slideway,
- wherein when the first frame and the second frame are placed one against the other with the at least one strip adjacent the at least one notch, the first and second frames are slidable relative to each other such that the whole of the at least one strip slides uniformly in a straight line along a length of the at least one slideway to a blind end of the at least one slideway and the second frame is detachably secured to the first frame.

18. A liquid crystal display comprising:
- a first frame comprising two opposite first side walls, each first side wall comprising:
  - at least two first notches and at least two first slideways defined therein, each of the first notches being directly in communication with the corresponding first slideway; and
  - a spring catch located between two of the at least two first notches; and
- a second frame comprising two opposite second side walls, the second side walls respectively corresponding to the first side walls, each second side wall comprising at least two first strips provided thereat;
- wherein each of the first strips of the second frame is slidable along the corresponding first slideway such that the first frame and the second frame are detachably engaged together.

19. The liquid crystal display as claimed in claim 18, wherein the second frame further comprises a third notch defined between two of the at least two first strips, the third notch corresponding to the spring catch.

20. The liquid crystal display as claimed in claim 19, wherein the spring catch is configured for allowing the second frame to be detached from the first frame.

* * * * *